UNITED STATES PATENT OFFICE.

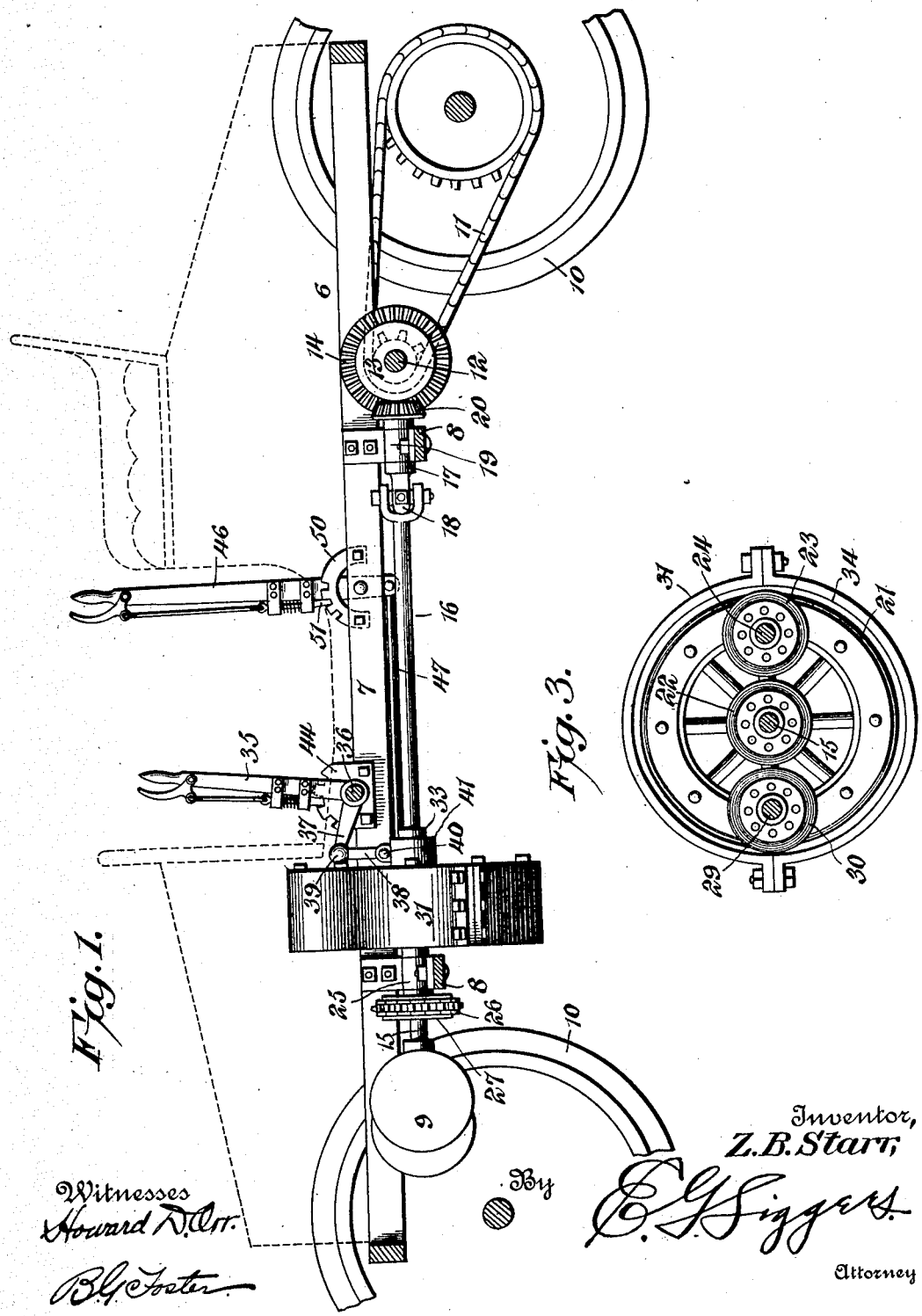

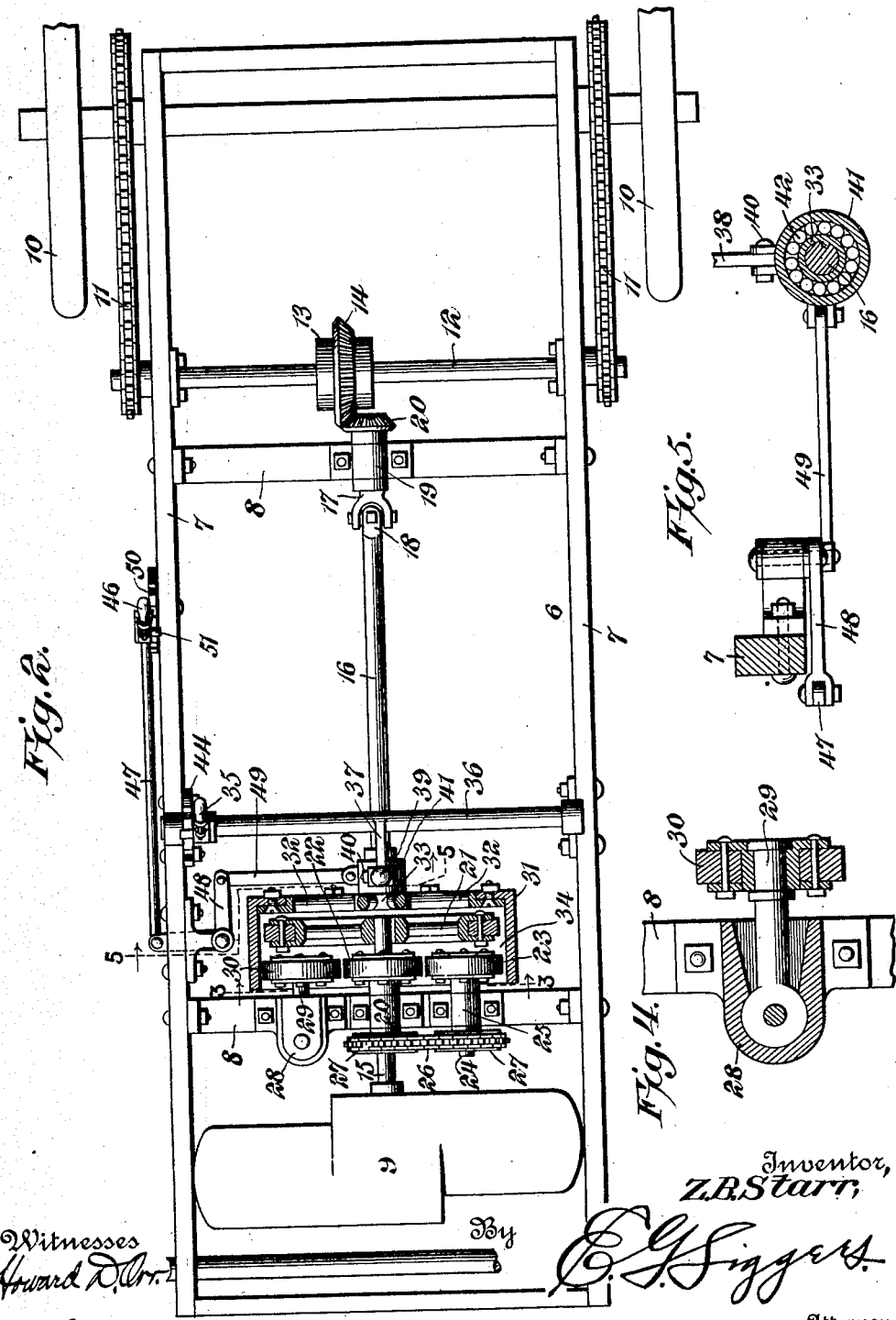

ZADOCK B. STARR, OF GLOVERSVILLE, NEW YORK.

POWER-TRANSMITTING MECHANISM.

No. 860,262.

Specification of Letters Patent.

Patented July 16, 1907.

Application filed August 28, 1906. Serial No. 332,396.

*To all whom it may concern:*

Be it known that I, ZADOCK B. STARR, a citizen of the United States, residing at Gloversville, in the county of Fulton and State of New York, have invented a new and useful Power-Transmitting Mechanism, of which the following is a specification.

This invention relates to mechanism for transmitting power from a driving member or motor to a driven member, and while particularly intended for transmitting power from a motor or engine of a self-propelled vehicle to the wheels thereof, it will be evident that it is not limited to use on this particular machine, but is capable of employment wherever differential or reverse speeds are desired.

One of the principal objects is to provide novel and effective means of a simple character, whereby the parts to be driven may be operated at different rates of speed, their direction of movement readily reversed, or said parts maintained at a standstill, while the motor or driving member is running at a constant speed.

The preferred embodiment of the invention is illustrated in the accompanying drawings, wherein:—

Figure 1 is a side elevation of the same, as applied to a self-propelled vehicle. Fig. 2 is a top plan view, portions being shown in section. Fig. 3 is a cross sectional view substantially on the line 3—3 of Fig. 2. Fig. 4 is a detail horizontal sectional view of the idler and its support. Fig. 5 is a detail sectional view on the line 5—5 of Fig. 2.

Similar reference numerals designate corresponding parts in all the figures of the drawings.

In the embodiment illustrated, a sill frame 6 is employed, the side members 7 of which are connected by cross bars 8, the motor is shown diagrammatically at 9, and the rear driving wheels are designated by the reference numeral 10, the same being suitably geared, as shown at 11 to a transverse shaft 12 having differential gearing 13 which includes a beveled wheel 14. So far as thus described, the mechanism is well known, and may be altered, as desired, the invention residing in the means for transmitting the power from the motor 9 to the shaft 12, and consequently to the wheels 10, though as already stated, this means may be employed for other purposes.

The engine or driving shaft is designated 15, and the parts associated therewith may be designated broadly as the driving means. The driven shaft comprises sections 16 and 17, connected by a universal joint 18, of any suitable construction. The rear section 17 is journaled in a boxing 19 mounted on the rear cross bar 8 and has a beveled pinion 20 meshing with the beveled gear 14. This driving shaft and its associated parts may be designated the driven member.

The driving shaft 15 is journaled as shown at 20 on the front cross bar 8 and has secured to its rear end a comparatively large friction gear 21 and a smaller friction gear 22, these two wheels being located on the portions of the shaft in rear of the cross bar. Another small friction gear 23 is carried by a stub shaft 24 that is journaled, as shown at 25 on the cross bar 8 at one side of the driving shaft 15, the outer portion of the wheel 23, extending beyond the plane of the corresponding portion of the large friction wheel 21, as clearly shown in Fig. 3. The inner portion of said friction wheel 23 is spaced from the adjacent portion of the friction wheel 22. The friction wheel 23 is connected to the shaft 15 by a sprocket chain 26 passing about sprocket wheels 27 secured respectively to the shafts 15 and 24. Thus it will be evident that the wheel 23 will rotate in the same direction as the wheel 21, but that the surface speed thereof will be considerably less than that of said wheel 21.

Pivotally mounted in a casing 28 on the cross bar 7 and on the opposite side of the shaft 15 to the shaft 24 is a swinging axle 29, projecting rearwardly of said cross bar, and having journaled thereon, a friction idler 30. This friction idler is capable of swinging into and out of engagement with the smaller friction gear wheel 22, and when in such engagement its outer portion extends beyond the periphery of the large friction gear wheel 21, as will be evident, particularly by reference to Figs. 2 and 3. The above described mechanism constitutes in effect the driving means.

Mounted on the front end of the section 16 of the driven shaft is a rotatable master wheel, in the form of a drum 31 connected by spokes 32 to a hub 33 suitably secured to the shaft section 16. The drum 31 incloses the various friction gears and the idler of the driving means, and its inner face 34 constitutes a friction surface that coöperates with certain of said wheels, and said idler. The drum is mounted on the section 16, and inasmuch as such section has a universal joint with the section 17, it is capable of movement transversely of the axes of rotation of the various parts, and in angularly disposed paths.

Means are provided for effecting its vertical movement, and also its horizontal movement. The former is secured by a lever 35, connected to a rock shaft 36, journaled in the side members of the sill frame 6, and having a crank arm 37. A depending link 38 has a ball and socket connection 39 with the crank arm, and the lower end of this link is pivoted, as shown at 40 to a collar 41 surrounding the hub 33, and having a roller bearing 42 therewith. A suitable rack 44 is arranged at one end of the rock shaft, and a dog, carried by the lever 35, coöperates with the rack to maintain the lever against movement, and in different positions. The horizontal movement of the drum is effected by another lever 46, fulcrumed between its ends on one of the side sills of the frame and connected at its lower end by a link 47 with a bell crank 48. This bell crank has a link connection 49 with the said collar 41. A rack 50, secured to the frame, and a dog 51, mounted on the lever 46, serve to hold said lever against movement and in different positions.

The operation of the structure may be briefly described as follows. Assuming that the motor 9 is running, it will be evident that the friction gears 21, 22 and 23 will be rotating in the same direction. If, however, the shaft 16 is disposed in alinement with the shaft 15, the drum 31 will be out of engagement with all of the wheels including the idler, as clearly illustrated in Fig. 3. Supposing, however, it is desired to rotate the shaft 17, at a low rate of speed and in the same direction as the shaft 15, the operator has only to grasp the lever 46 and push its upper end forwardly, whereupon the drum 31 will be swung to one side so that the friction surface 34 will engage with the outer side of the friction wheel 23. When so engaged, the drum of course will be rotated at a low rate of speed, and will still be out of engagement with the other driving wheel. If a reverse direction of movement is desired, then the upper end of the lever 46 is moved rearwardly, whereupon the opposite portion of the driving surface 34 is brought into engagement with the outer side of the friction idler 30, and this idler is then moved into frictional engagement with the smaller driving gear 22. The result is that the power is transmitted from the driving gear 22 through the idler 30, and the drum with all the connected parts, is revolved slowly in the opposite direction. If, on the other hand, high speed of the driving member is desired, the lever 46 is placed in its central position, so that the drum will be out of engagement with both the wheel 23 and the idler 30, and the lever 35 is moved in either direction. The result is that the drum is moved in a vertical path, and will be engaged with either the upper or lower side of the large gear wheel 21. The surface speed of this wheel, as already stated, being much greater than the wheel 23, will cause the rotation of the drum 31 at a much higher rate.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In power transmission mechanism, the combination with a rotatable drum, of wheels of different diameters arranged one behind the other and in overlapping relation within the drum, and means for effecting a relative movement between the drum and wheels to effect an engagement between the former and any of the latter.

2. In power transmission mechanism, the combination with a rotatable drum, of a rotatable shaft projecting into the drum, a wheel of comparatively large diameter fixed to the shaft within the drum, another wheel of less diameter disposed at one side of and in overlapping relation to the larger wheel, said smaller wheel being also located within the drum, gearing connecting the shaft and smaller wheel, and means for effecting a relative movement between the drum and wheel to effect an engagement between the former and either of the latter.

3. In power transmission mechanism, the combination with a rotatable drum, of a rotatable shaft projecting into the drum, a wheel of comparatively large diameter fixed to the shaft within the drum, another shaft disposed alongside the first mentioned shaft and geared thereto, another wheel of less diameter disposed at one side of and in overlapping relation to the larger wheel, said smaller wheel being also located within the drum and fixed to the second shaft, and means for moving the drum in angularly disposed directions to move the same into coaction with the different wheels.

4. In power transmitting mechanism, the combination with a shaft, of a drum, a plurality of wheels connected to the shaft, an idler associated with one of the wheels, and means for effecting a relative movement between the drum and wheels transversely of their axes of rotation to effect an engagement between the drum and the other wheel or the idler.

5. In power transmitting mechanism, the combination with a shaft, of a drum, a plurality of wheels of different diameters connected to the shaft, an idler associated with one of the wheels, and means for effecting a relative movement between the drum and wheels transversely of their axes of rotation to effect an engagement between the drum and the other wheel or the idler.

6. In power transmitting mechanism, the combination with a shaft, of a drum, a plurality of wheels of different diameters mounted on the shaft, an idler associated with the smaller wheel, and means for moving the drum transversely of its axis of rotation, to effect an engagement between it and the larger wheel or the idler.

7. In power transmitting mechanism, the combination with a shaft, of a wheel fixed to the shaft, another wheel journaled at one side of the shaft, gearing connecting the latter wheel to the shaft, an idler associated with the wheel that is fixed to the shaft, a drum surrounding the wheels, and means for moving the drum transversely of its axis of rotation, to engage the same with the idler or with the wheel that is geared to the shaft.

8. In power transmitting mechanism, the combination with a shaft, of friction wheels of different diameters mounted on the shaft, an idler having a swinging support, said idler coacting with the smaller friction wheel, another friction wheel geared to the shaft and located at one side of the same, a drum surrounding the various wheels and the idler, and means for moving the drum transversely of its axis of rotation, to carry the same into engagement with the larger friction wheel, the idler or the friction wheel that is geared to the shaft.

9. In power transmission mechanism, the combination with a drum, of a plurality of wheels located within the drum, an idler associated with one of the wheels and the drum, said drum coacting directly with the other wheel, and means for effecting a relative movement between the drum, the wheels and idler to effect an engagement between said drum and the said idler or between the drum and the wheel direct.

10. In power transmission mechanism, the combination with a drum, of a plurality of wheels of different diameters located one behind the other within the drum, an idler associated with the smaller wheel and with the drum, said idler being located at one side of and in overlapping relation to the larger wheel, said drum coacting directly with the larger wheel, and means for effecting a relative movement between the drum, the wheel and idler to effect an engagement between the said drum and the idler or between the said drum and the larger wheel.

11. In power transmitting mechanism, the combination with a shaft, of friction wheels of different diameters mounted on the shaft, an idler associated with the smaller friction wheel, a drum surrounding the friction wheels, and the idler, and means for swinging the drum transversely of its axis of rotation in one path of movement to engage the same with the larger friction wheel and for moving said drum in another and angularly disposed path for engaging the drum with the idler.

12. In power transmitting mechanism, the combination with a shaft, of friction wheels of different diameters fixed to the shaft, a friction idler associated with one of the wheels and having a movable support, another friction wheel journaled at one side of the shaft, and geared thereto, a drum surrounding the friction wheels and idler, a shaft connected to said drum and having a universal joint, said drum being movable transversely of its axis of rotation and in angularly disposed paths to engage the different wheels and idler, and a plurality of levers having connections with the drum for effecting its movement in said angularly disposed paths.

In testimony, that I claim the foregoing as my own, I have hereto affixed my signature in the presence of two witnesses.

ZADOCK B. STARR.

Witnesses:
CLARK L. JORDAN,
MERRILL B. ALLISON.